US007840840B2

(12) United States Patent
Takahashi et al.

(10) Patent No.: US 7,840,840 B2
(45) Date of Patent: Nov. 23, 2010

(54) DC BACKUP POWER SUPPLY SYSTEM, A DISK ARRAY AND A DC BACKUP POWER SUPPLY

(75) Inventors: Fumikazu Takahashi, Hitachi (JP); Minehiro Nemoto, Oyama (JP); Isao Nemoto, legal representative, Oyama (JP); Akihiko Kanouda, Hitachinaka (JP); Masahiro Hamaogi, Odawara (JP); Yoshihide Takahashi, Odawara (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 118 days.

(21) Appl. No.: 12/180,977

(22) Filed: Jul. 28, 2008

(65) Prior Publication Data

US 2008/0290733 A1 Nov. 27, 2008

Related U.S. Application Data

(63) Continuation of application No. 10/951,613, filed on Sep. 29, 2004, now Pat. No. 7,406,623.

(30) Foreign Application Priority Data

Sep. 29, 2003 (JP) ............................. 2003-337157

(51) Int. Cl.
*G06F 11/00* (2006.01)
(52) U.S. Cl. .......................... 714/14; 714/22; 713/300
(58) Field of Classification Search .................. 714/14, 714/22
See application file for complete search history.

(56) References Cited

U.S. PATENT DOCUMENTS

| 5,319,571 | A | 6/1994 | Langer et al. |
| 5,381,554 | A | 1/1995 | Langer et al. |
| 5,461,263 | A | 10/1995 | Helfrich |
| 5,585,677 | A | 12/1996 | Cheon et al. |
| 5,889,933 | A | 3/1999 | Smith |
| 7,406,623 | B2 * | 7/2008 | Takahashi et al. ............. 714/14 |
| 2002/0186576 | A1 | 12/2002 | Kanouda et al. |
| 2004/0073817 | A1 | 4/2004 | Liu et al. |

FOREIGN PATENT DOCUMENTS

| JP | 1-175014 | 7/1989 |
| JP | 2-023045 | 1/1990 |
| JP | 11-184569 | 7/1999 |
| JP | 2000-116029 | 4/2000 |

* cited by examiner

*Primary Examiner*—Emerson C Puente
(74) *Attorney, Agent, or Firm*—Antonelli, Terry, Stout & Kraus, LLP.

(57) ABSTRACT

A DC backup power supply system having a plurality of loads to which AC from a commercial power source is supplied, and DC power storage means for supplying DC power to the plurality of loads at the time of a power outage of the commercial power source, said DC backup power supply system including: a control circuit having a first DC backup output for supplying a power from the DC power storage means to the plurality of the loads, including a specific load, only during the power outage of the commercial power source, and a second DC backup output for continuously supplying a power from the DC power storage means to the specific load regardless of the power outage of the commercial power source or sound operation thereof, the control circuit supplying the respective powers from the same DC power storage means to the first and second DC backup outputs.

19 Claims, 9 Drawing Sheets

DC BACKUP POWER SUPPLY SYSTEM, A DISK ARRAY AND A DC BACKUP POWER SUPPLY

CROSS REFERENCE TO RELATED APPLICATION

This is a continuation of U.S. application Ser. No. 10/951,613, filed Sep. 29, 2004 now U.S. Pat. No. 7,406,623. This application relates to and claims priority from Japanese Patent Application No. 2003-337157, filed on Sep. 29, 2003. The entirety of the contents and subject matter of all of the above is incorporated herein by reference.

BACKGROUND OF THE INVENTION

The present invention relates to a DC backup power supply system having a non-service interruption function, and a disk array provided with the same.

With communication/information equipment such as a disk array, AC is received from a commercial AC power source to be thereby converted into DC by an AC/DC converter, whereupon the DC is further adjusted so as to be at various voltages required by respective circuits in the disk array by DC/DC converters before supplying power to the respective circuits (loads). As an uninterrupted power supply (UPS) in this field, there is, for example, a technology disclosed in Patent Document 1. In the case of the technology, a backup power supply is connected to DC paths between a converter and respective loads inside equipment, and power from an AC power source is converted into DC power when the converter is in normal operation, thereby supplying the DC power to the respective loads while charging a battery. At the time of a power outage, DC power is supplied from the backup power supply to a plurality of loads through the intermediary of switchover means for selectively switching over between the plurality of the loads before connection. Then, when there is a drop in the amount of the actual capacity that remains in the backup power supply, power supply to the respective loads is sequentially stopped in decreasing order of power consumption, thereby implementing operation of main specific loads for long-duration.

Further, in Patent Document 2, there is disclosed a backup power supply of an intrusion monitoring system, having a switch for switching over between a commercial power source and the backup power supply at the time of a power outage, and for limiting operation time of a warning speaker, thereby causing a monitoring function of the backup power supply to be maintained for long duration thereafter.

[Patent Document 1] JP-A No. 156942/2000 (in whole)

[Patent Document 2] JP-A No. 23054/2001 (Paragraph Nos. 26 to 30, FIGS. 4 to 6, and others)

SUMMARY OF THE INVENTION

With a backup power supply system disclosed in Patent Document 1, there is the need for a number of switches for switching over, as many as the number of the plurality of the loads, and a controller for controlling these switches becomes complex in configuration, resulting therefore in an increase in cost and deterioration in reliability.

Also, with a backup power supply system disclosed in Patent Document 2 as well, all loads receive power supply from the backup power supply at the time of a power outage through the intermediary of switches for switching over. Accordingly, there is the need for the switches, and a controller thereof, to which extent the reliability of the backup power supply system as an uninterrupted power supply to important loads will be impaired.

It is therefore an object of the invention to provide a DC backup power supply system capable of implementing highly reliable backup for important loads.

Further, another object of the invention is to provide a disk array provided with a highly reliable DC backup power supply for a cache memory.

Furthermore, still another object of the invention is to provide a DC backup power supply system capable of rendering backup voltage and backup capacity variable depending on the conditions of loads.

To those ends, according to one aspect of the invention, there is provided a supply circuit for supplying a first DC backup output from DC power storage means, such as a battery, and forth, to a plurality of loads, including an important specific load, at the time of a power outage of a commercial power source while supplying a second DC backup output from the DC power storage means to the important specific load regardless of the power outage of the commercial power source or sound operation thereof.

Further, a DC backup power supply system according to the invention interrupts the first DC backup output upon the passage of a predetermined time after the power outage, and/or by a predetermined signal, whereupon the second DC backup output is automatically supplied to the specific load.

Still further, to resolve other problems described above, the DC backup power supply system according to the invention comprises an AC/DC converter for converting AC power into DC power to thereby execute power supply to a plurality of loads, and a circuit for supplying a first DC backup output from DC power storage means such as a battery to the plurality of the loads, including an important specific load, at the time of a power outage of a commercial power source, stopping thereafter the first DC backup output upon the passage of a predetermined time, and/or in response to a predetermined signal, and for supplying a second DC backup output from the DC power storage means to the important specific load regardless of the power outage of the commercial power source or sound operation thereof.

Yet further, the DC backup power supply system according to the invention comprises a circuit for supplying a first DC backup output from DC power storage means to a plurality of loads, including a cache memory inside a disk array until a predetermined time or a predetermined signal is received at the time of a power outage of a commercial power source, and for supplying a second DC backup output from the DC power storage means to the cache memory regardless of the power outage of the commercial power source or sound operation thereof.

Further, to resolve other problems described above, according to another aspect of the invention, there is provided a DC backup power supply system having DC power storage means comprising a unit battery composed of a single cell or a plurality of battery cells connected in series, and a plurality of parallel-connected unit battery groups composed of a plurality of the unit batteries connected in series, said DC backup power supply system further comprising a control circuit incorporating, connection switchover means capable of optionally changing the number of parallel-connections of the unit battery groups so as to correspond to a backup capacity of loads and implementing series-connection of the unit batteries inside the respective unit battery groups, a charger for recharging the respective unit battery group with DC power, and an output circuit through which DC power is discharged from the respective unit battery group to the loads.

Thus the invention can provide the DC backup power supply system with further enhanced reliability in respect of a non-service interruption function against the specific load.

Further, with the invention, a disk array having high reliability can be implemented.

Still further, with the invention, since a backup voltage and backup capacity are rendered finely variable by virtue of a battery unit configuration method, and the connection switchover means for battery units, the DC backup power supply system can be applied to a variety of load configurations, and power supply systems, thereby enhancing its general versatility.

DETAILED DESCRIPTION OF THE INVENTION

Figure 1:
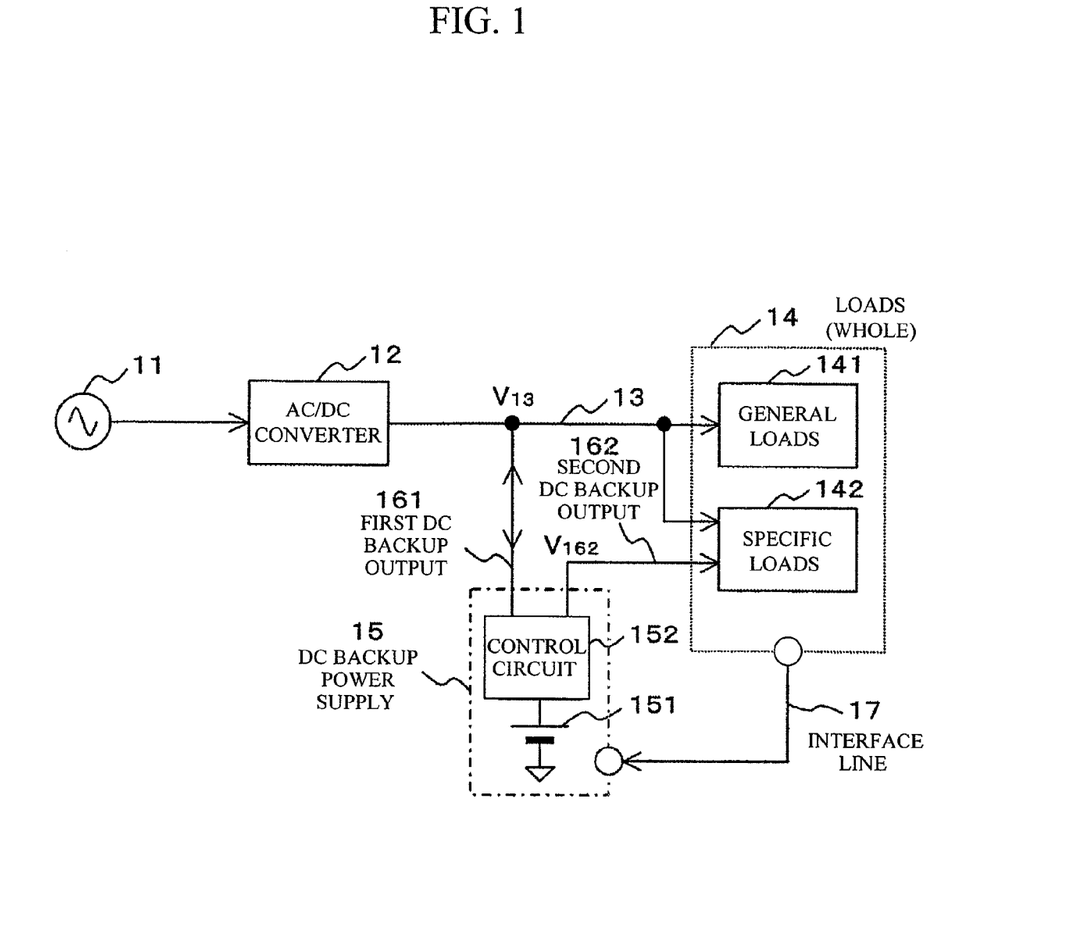
FIG. 1 is a schematic block diagram of an embodiment of the invention.

FIG. 1 is a schematic block diagram of a first embodiment of a DC backup power supply system according to the invention. With the present power supply system, an AC at 100 V or 200 V is normally delivered from a commercial AC power source 11 to be converted into DC power by an AC/DC converter 12, and the DC power is supplied to loads 14 through a power line 13. The loads 14 includes a plurality of loads, such as general loads 141, a specific load 142, and so forth, and description is given hereinafter on the assumption that the specific load 142 among the plurality of loads is a load to which backup is important. A DC backup power supply 15 is installed to provide backup at the time of a power outage of the commercial AC power source 11.

The DC backup power supply 15 comprises DC power storage means 151, such as a battery, and so forth, and a control circuit 152. The control circuit 152 detects a drop in a voltage $V_{13}$ of an output power line 13 of the AC/DC converter 12 at the time of the power outage, and supplies a first DC backup output 161 from the DC power storage means 151 to the plurality of the loads, that is, the general loads 141, the specific load 142, ... through the power line 13. Further, there is provided a circuit for supplying a second DC backup output 162 from the DC power storage means 151 to the specific load 142, one of the plurality of the loads, regardless of the power outage of the commercial AC power source 11 or sound operation thereof. In addition, the control circuit 152 determines the amount of the actual capacity that remains in the DC power storage means (battery) 151 when the commercial AC power source 11 is in sound operation, thereby controlling recharging of the battery 151 from the AC/DC converter 12 via a power line of the first DC backup output 161.

Further, keeping the configuration of the present power supply system as it is, a variation thereto is conceivable such that an output power line from the AC/DC converter 12 is newly added, and is connected to a power line of the second DC backup output 162. In this case, it becomes possible to recharge the DC power storage means 151 via the power line of the second DC backup output 162, as well.

For the DC power storage means 151, use is preferably made of various secondary batteries, such as, for example, nickel-hydrogen (NiMH) batteries, lithium (Li) batteries, and so forth, and further, capacitors, such as, for example, electric double layer capacitors, may be adopted.

With the present embodiment, an interface line 17 leading from the loads 14 to the DC backup power supply 15 is provided, and a method of making use of the interface line 17 will be described later on.

Figure 2:
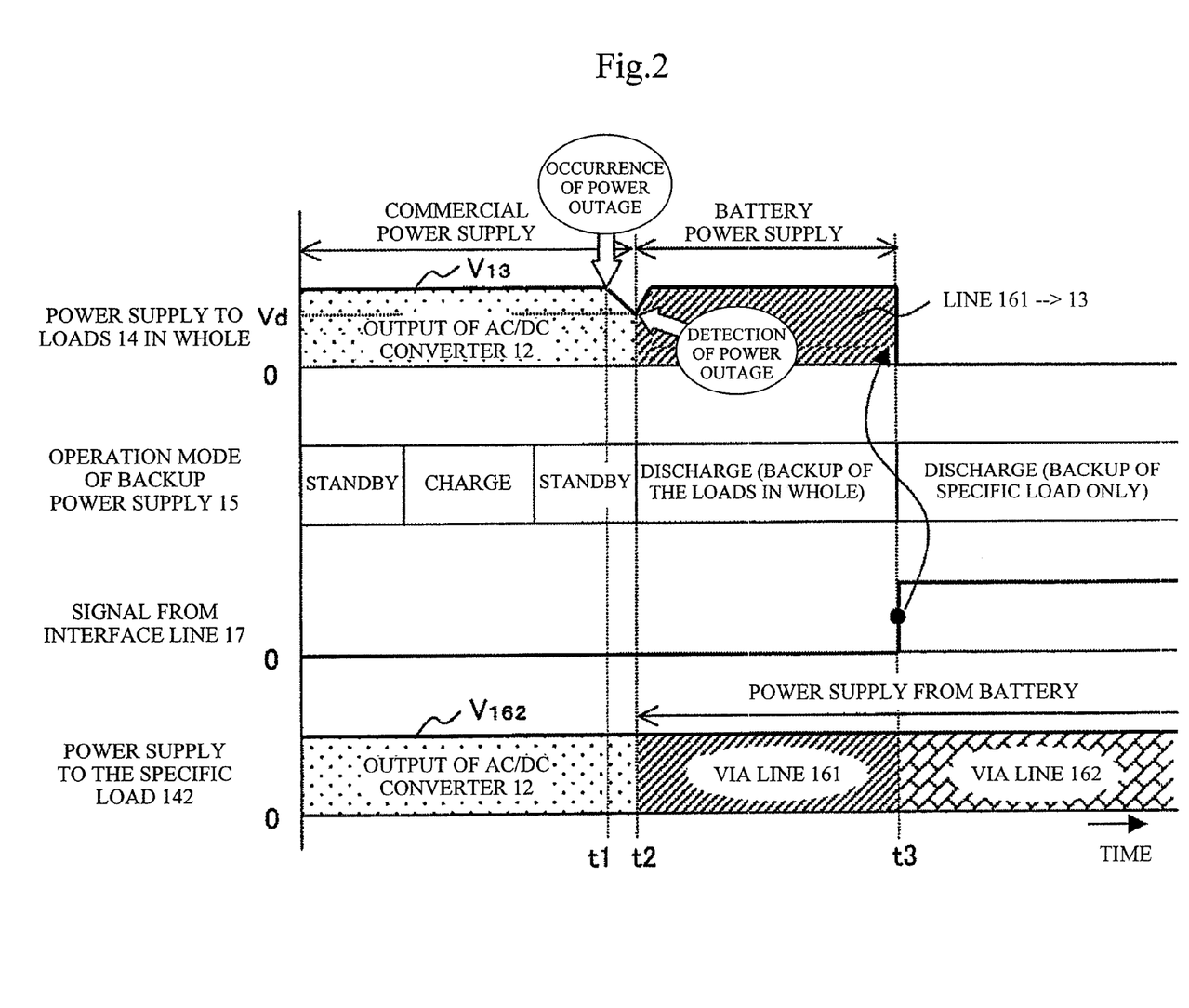
FIG. 2 is a time chart describing the operation according to the first embodiment of the invention.

FIG. 2 is a time chart describing the operation of the first embodiment of the invention. When the commercial AC power source 11 is in sound operation, power is supplied from the AC/DC converter 12 to the loads 14 in whole. That is, a time period up to a time t1 when power outage occurs is a time period of power supply from the commercial AC power source 11, at the output voltage $V_{13}$ of the AC/DC converter 12. During this time period, the DC backup power supply 15 is either in a standby mode in preparation for power outage, or in a recharge mode depending on the remaining amount of electric charge in the battery 151, thereby controlling the amount of the actual capacity that remains in the battery 151 at a predetermined value.

Meanwhile, the control circuit 152 sends out a DC voltage $V_{162}$ from the battery 151 to the power line of the second DC backup output 162 regardless of the sound operation of the commercial AC power source 11 or the power outage thereof, and is connected to the specific load 142. However, by use of such a circuit for giving priority to the output from the power line 13 as described later on, power is now supplied through the power line 13 from the commercial AC power source 11 to the loads 14 including the specific load 142 via the AC/DC converter 12.

Upon the occurrence of the power outage at the time t1, the output voltage $V_{13}$ of the AC/DC converter 12 keeps dropping. At a time t2 when the output voltage $V_{13}$ comes down to a predetermined voltage Vd designed so as to be not lower than the lower limit of voltages causing no malfunction of the loads 14, the control circuit 152 determines that the power outage has occurred, thereby starting power supply to the power line of the first DC backup output 161. By so doing, the voltage $V_{13}$ of the power line 13 is immediately raised to the same level as that for the time period of the power supply from the commercial AC power source 11. As a result, from an outage detection time t2 onward, power supply to the loads 14 in whole can be continued from the battery 151 through the control circuit 152, the power line of the first DC backup output 161, and the power line 13. From the outage detection time t2 onward as well, power is supplied from the battery 151, and the control circuit 152, to the loads 14 in whole, including the specific load 142, through the power line of the first DC backup output 161, and the power line 13 by virtue of the circuit for giving priority to the output from the power line 13.

Now, at a time t3 upon the passage of a predetermined time from the time t2, the backup power supply 15 stops power supply to the power line of the first DC backup output 161 by means of the control circuit 152. The backup power supply 15 is in a discharge mode from the time t2 onward, but stops backup of the general loads 141 upon arriving at the time t3, thereby switching over to the backup of only the specific load 142, in particular, to which continuation of power supply is important. Since the specific load 142 only is backed up from the time t3 onward, it is possible to hold back power consumption to the minimum, so that the specific load 142 can be backed up for long duration.

As a result, backup operation is as shown in FIG. 2. First, until the time t1, up to when the commercial AC power source 11 has been in sound operation, and until the time t2 when outage is detected, the power supply to the loads 14 in whole is naturally executed all from the AC/DC converter 12. Subsequently, up to the time t3 after the occurrence of the power outage, power is supplied from the battery 151 to the loads 14 in whole, including the specific load 142, through the normal power line 13, via the power line of the first DC backup output 161. Then, upon arriving at the time t3 with the passage of a predetermined time, supply of the first DC backup output 161 is terminated, thereby stopping the power supply from the power line 13. At this point in time, a circuit for supplying power from the battery 151 to the specific load 142 through the power line of the second DC backup output 162 is configured so as to operate regardless of the sound operation of the commercial AC power source 11 or the power outage thereof, as previously described. Consequently, although the power supply to the general loads 141 is terminated, power supply to the specific load 142 is continued after automatic switching over to power supply from the battery 151 to the power line of the second DC backup output 162.

Accordingly, there is no need for switching means turning ON/OFF depending on the occurrence of the power outage and means for controlling the same, provided inside this backup circuit. Hence, the power line of the second DC backup output 162 has enhanced reliability.

Also, from the time t2 onward, and prior to the time t3, the power supply to the specific load 142 through the power line of the second DC backup output 162 can be started as necessary.

The present embodiment can provide the DC backup power supply system capable of rendering the output DC voltage of the AC/DC converter 12 uninterruptible, thereby enabling the power supply to the loads 14 to be implemented even at the time when the AC/DC converter 12 is out of order besides the time of the power outage. Since the DC backup power supply system is a simple backup power supply system requiring no switching of connection for the power supply to the specific load 142 in such a case, high reliability is obtainable.

Now, in FIG. 1, there is provided the interface line 17 leading from the loads 14 to the DC backup power supply 15 as previously described. At the time of the power supply from the DC backup power supply 15 to the loads 14, including the time of the power outage and the time when the AC/DC converter 12 is out of order, stoppage of the first DC backup output 161 can be instructed through the interface line 17. Also, at the time of planned stoppage in operation of the loads 14, a stop instruction to the DC backup power supply 15 can be sent out through the interface line 17. Through coordinated operation of the DC backup power supply 15, and the loads 14 by use of the interface with the loads 14, a power supply system with high added values can be implemented.

Next, referring to FIG. 2 again, there is described the operation of the present embodiment, at a time when the interface line 17 is put to use. The operation from the occurrence of the power outage at the time t1 until the start of the power supply to the loads 14 in whole upon the detection of the outage at the time t2 is the same as the previously-described operation of the present embodiment. Then, upon changing of a signal of the interface line 17 from the loads 14 from a low level to a high level at the time t3, the backup power supply 15 stops the power supply to the power line of the first DC backup output 161, whereupon the backup power supply 15, which has been in the discharge mode from the time t2 onward, is switched over from the backup of the loads 14 in whole to the backup of the specific load 142 from the time t3 onward by an instruction from the loads 14.

A change in the signal of the interface line 17 can be caused to occur at a time when, for example, the loads 14 determines that a power outage has occurred, and executes a stop processing internally, thereby coming into a state where the operation can be safely stopped, and the power supply may be stopped. A change in the signal of the interface line 17 also can be caused to occur if it is desired that the power supply to the specific load 142 is continued for a duration as long as possible after a power outage in the case where the power outage is prolonged. Further, as to means for enabling the loads 14 to determine that the power outage has occurred, a notification on the occurrence of the power outage may be given from the backup power supply 15 to the loads 14, or the AC/DC converter 12 may incorporate an outage detection circuit to thereby give a notification on the occurrence of the power outage to the loads 14.

Figure 3:
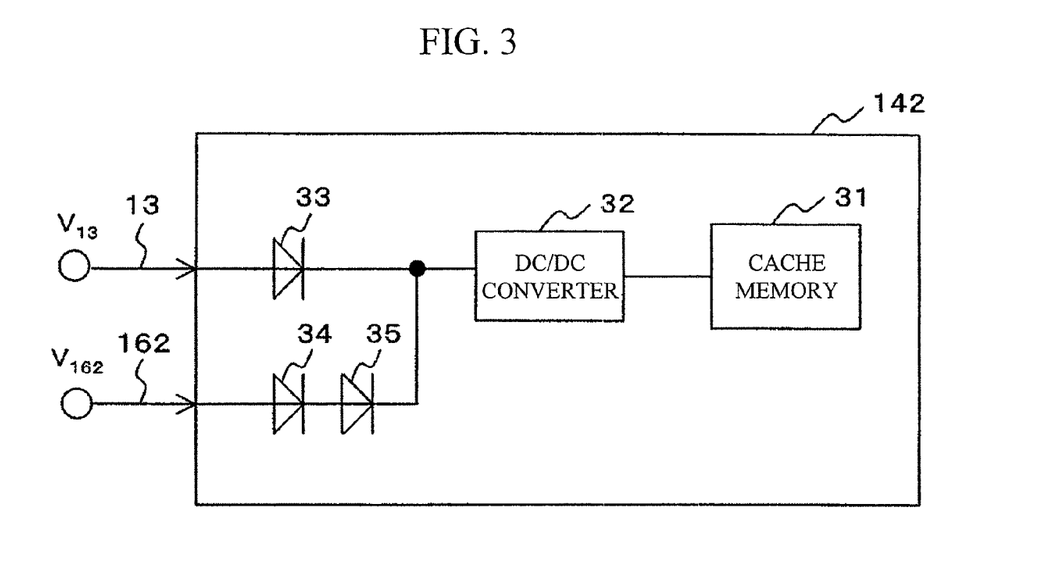
FIG. 3 is a block diagram showing a specific configuration example of a specific load 142 according to the first embodiment of the invention.

FIG. 3 is a block diagram showing a specific configuration example of the inside of the specific load 142 according to the first embodiment of the invention. The specific load 142 comprises a DC/DC converter 32 for stepping down the output voltage $V_{13}$ of the AC/DC converter 12 to a lower voltage to thereby deliver a DC voltage to a cache memory 31, and so forth, and diodes 33 to 35.

The DC/DC converter 32 is for stepping down an input voltage on the order of, for example, 30 V to 60 V to a voltage at 5 V, 3.3 V, 1.5 V, or 1.0 V, or a voltage lower than those to be subsequently sent out. There is also a case where a variety of LSIs, such as a microcomputer processor, and so forth, a hard disk drive, a fan, and so forth, besides the cache memory 31, are connected to the back stage of the DC/DC converter 32.

Now, the functions of the diodes 33 to 35 are described hereinafter. First, these diodes prevent current from sneaking into both the power line of the second DC backup output 162 of the backup power supply 15, and the power line 13 for the output of the AC/DC converter 12. Further, by changing the number of the diodes in series, in respective input lines, a difference between forward voltage drops (layered voltages) is utilized, thereby configuring the circuit for giving priority to the power supply from the power line 13 as previously described. That is, when the commercial AC power source 11 is in sound operation, power can be supplied from the AC/DC converter 12 to the DC/DC converter 32 without fail, thereby eliminating consumption of the power from the DC backup power supply 15. Further, by stopping the first DC backup output 161, switchover to the backup of the specific load 142 from the power line of the second DC backup output 162 can be automatically implemented.

Figure 4:
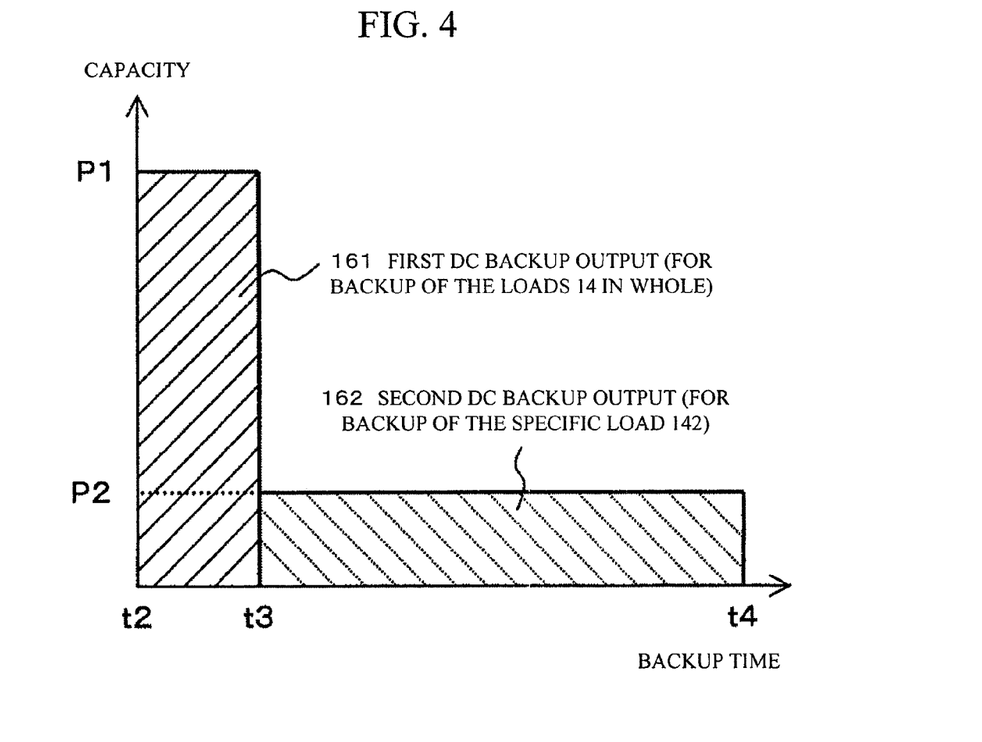
FIG. 4 is a graph showing a relationship between time and two different power capacities of a DC backup power supply according to the first embodiment of the invention.

FIG. 4 is a graph showing a relationship between time and two different power capacities of the DC backup power supply 15 according to the first embodiment of the invention. The backup of the loads 14 in whole by the first DC backup output 161 is started from the time t2 onward, and with the passage of the predetermined time (t3 minus t2), or from the time t3 when the instruction from the loads 14 arrives at, and onward, the backup of the specific load 142 only is executed by the second DC backup output 162. As is evident from FIG. 4, the first DC backup output 161 provides high output backup in short time. For example, a time period of the time t3 minus t2 is in a range of several seconds to dozens of minutes, and power capacity P1 is in a range of several hundred to several thousand watts. On the other hand, the second DC backup output 162 provides low output backup in longer time. For example, a time period of a time t4 minus the time t3 extends over dozens of hours, and power capacity P2 is dozens of watts. Thus, the power capacity of the first DC backup output 161 is not less than ten times as large as the power capacity of the second DC backup output 162 delivered to the specific load 142 while the duration of the first DC backup output 161 is not more than one tenth of the duration of the second DC backup output 162.

Figure 5:
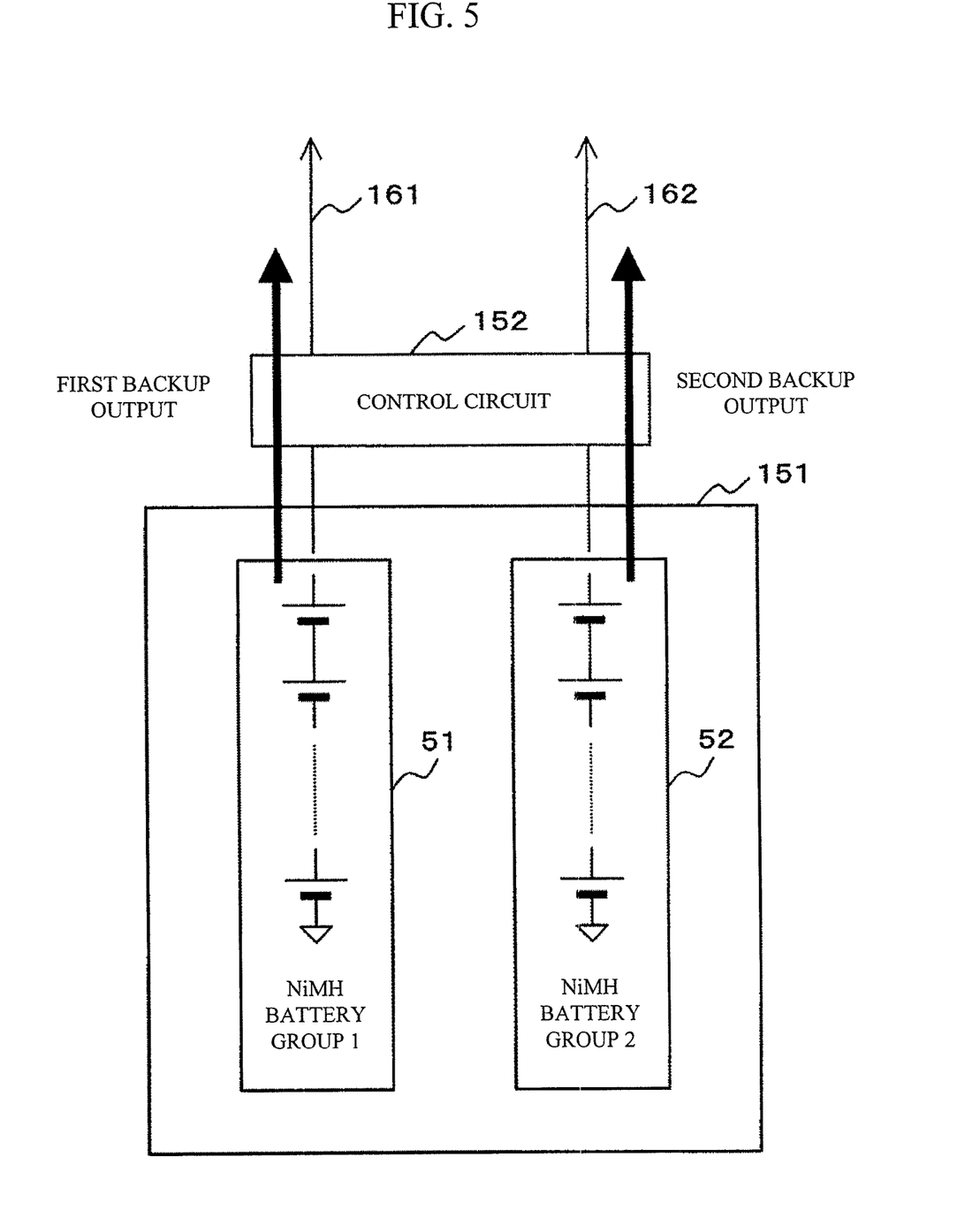
FIG. 5 is a block diagram showing a configuration example of DC power storage means 151 according to the first embodiment of the invention.

FIG. 5 is a block diagram showing a configuration example of the DC power storage means 151 according to the first embodiment of the invention. The example represents a case where the DC power storage means 151 comprises nickel-hydrogen (NiMH) battery groups 51, and 52. In this case, batteries of the same kind, differing, however, in discharge rate, and size, are installed in the respective battery groups 51, and 52. For example, a multitude of batteries capable of causing discharge current of not less than 4C to flow are connected in series in the battery group 51. On the other hand, a multitude of batteries capable of causing discharge current of less than 4C only to flow are connected in series in the battery group 52, so that the battery groups 51, and 52 have battery capacities corresponding to the first DC backup output 161, and the second DC backup output 162, respectively, as described with reference to FIG. 4.

Thus, it is possible to aim at reduction in the cost of the DC power storage means 151 by disposing the batteries differing in respect of discharge current in such a way as to correspond to the natures of the respective backups, in isolation from each other.

With the present embodiment, there is described a case of the DC power storage means being made up of the NiMH batteries, however, the DC power storage means may be made up of various kinds of secondary batteries such as Li secondary batteries, and so forth, instead. Further, it is conceivable to make up the battery groups by combination of various kinds of secondary batteries, making up, for example, the battery group 51 with the NiMH batteries while making up the battery group 52 with the Li secondary batteries. Furthermore, with the present embodiment, only two battery groups are shown in the figure, however, the number of the battery groups may be increased to three, or four instead. The number of battery cells in series is dependent on the output voltage of the AC/DC converter 12, that is, the voltage $V_{13}$ of the DC power line 13 for backup, but an excessive increase in the number of the battery cells in series is not preferable from the viewpoint of reliability, and consequently, an increase up to the order of 60 cells is regarded appropriate. In the case of backup capacity and time on the order described with reference to FIG. 4 by way of example, the number of the battery cells in series, on the order of 30 to 50 cells, is appropriate.

Figure 6:
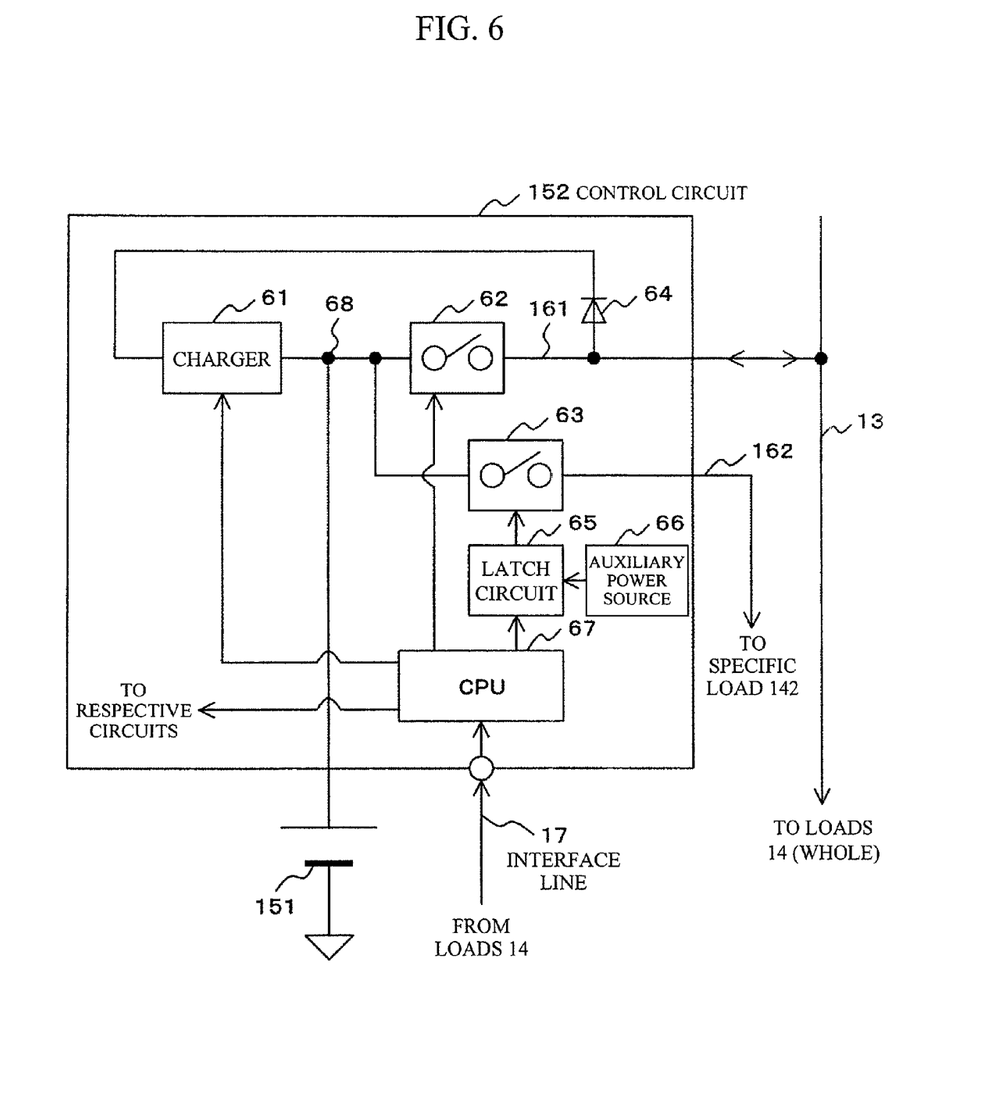
FIG. 6 is a block diagram showing a specific configuration example of a control circuit 152 according to the first embodiment of the invention.

FIG. 6 is a block diagram showing a specific configuration example of the control circuit 152 according to the first embodiment of the invention. The control circuit 152 comprises a charger 61 for recharging the DC power storage means 151, an output circuit 62 for delivering DC power of the DC power storage means 151 to the loads 14 in whole at the time of a power outage, and an output circuit 63 for similarly delivering the DC power to the specific load 142. A diode 64 makes up a circuit for taking in charging power to the charger 61 from the power line 13. A latch circuit 65 is supplied with power from an auxiliary power source 66 and interrupts the output circuit 63 in response to the necessity of protection and so forth as described later on. A CPU 67 executes controls of the charger 61 and the respective circuits.

Now, the operation of the control circuit 152 is described by way of example. At the time of recharging, the charger 61 starts operation in accordance with a charging instruction from the CPU 67. The charger 61 executes power supply from the power line 13 for the output of the AC/DC converter 12 to the DC power storage means 151 via the diode 64. The charger 61 conceivably comprises, for example, a constant current control circuit, recharging the DC power storage means 151 with a constant current. The CPU 67 also executes controls of a circuit for monitoring the conditions of the DC power storage means 151, such as voltage, temperature, and so forth, an outage detection circuit, a protection circuit, and so forth, respectively, besides the controls as previously described.

At the time of a power outage, the output circuit 62 is turned ON in accordance with a discharge instruction from the CPU 67, thereby starting backup to the loads 14 in whole. Subsequently, upon receiving a backup switch instruction from the loads 14 through the interface line 17, the CPU 67 turns OFF the output circuit 62. The output circuit 63 is normally in the ON condition. Thereafter, the CPU 67 turns OFF power supply for the respective circuits including the CPU 67 while keeping alive only the auxiliary power source 66 for providing power supply to the latch circuit 65, thereby holding back power consumption of the DC power storage means 151 to the minimum. By so doing, the specific load 142 can be backed up for long duration.

The output circuit 63 that is normally in the ON condition, that is, normally ON is provided for protection, and so forth, and keeps connecting an output line 68 of the DC power storage means 151 to the specific load 142 through the line for the second DC backup output 162 all the time except for the case of the protection, and so forth. By so doing, due to the stoppage of the first DC backup output 161, the operation automatically shifts to the power supply to the specific load 142 with the second DC backup output 162, and the output circuit 63 is unnecessary in case there is no necessity of interrupting the same as described below. More specifically, it is presumed that the necessity of interrupting the output circuit 63 arises in, for example, the following three cases, namely, firstly 1) a case of stopping the output of the DC power storage means 151 at the time of an internal trouble thereof, secondly 2) a case of handling the backup of the specific load 142 as an option, coping with a case of dispensing with the backup of the specific load 142 depending on a type of the operation, and lastly 3) a case where since the DC power storage means 151 will be dead sooner or later if the specific load 142 is backed up for long duration, the backup is terminated, and a switch is therefore provided for protection at the time of such termination.

When a stop instruction is received from the loads 14 through the interface line 17, the CPU 67 can turn OFF all the power supplies including that from the auxiliary power source 66, thereby stopping the operation of the control circuit 152.

The present embodiment described as above can be summed up as follows. First, the object of the present embodiment is the DC backup power supply system comprising the AC/DC converter 12 for receiving AC from the commercial AC power source 11 and supplying DC power to the plurality of loads, such as the general loads 141, and the specific load 142, and the DC power storage means 151 for supplying DC power to the plurality of loads at the time of the power outage of the commercial AC power source 11. At the time of the power outage of the commercial AC power source, the first DC backup output 161 is supplied from the DC power storage means 151 to the plurality of the loads including the specific load 142 comprising the cache memory, and so forth. Further, there is provided the control circuit 152 for stopping the first DC backup output 161 thereafter with the passage of the predetermined time, and/or in response to the predetermined signal (the signal from the interface line 17), and for connecting the line of the second DC backup output 162 from the DC power storage means 151 to the specific load 142 regardless of the power outage of the commercial AC power source 11 or the sound operation thereof. The line for the first DC backup output 161 toward the plurality of the loads is a two-way output line through which recharging or discharging of the DC power storage means 151 can be carried out. Furthermore, the power capacity of the first DC backup output 161 to the plurality of the loads is not less than ten times as large as the power capacity of the second DC backup output 162 delivered to the specific load 142, and the output time of the first DC backup output 161 is not more than one tenth of the output time of the second DC backup output 162 (refer to FIG. 4).

With the adoption of such a configuration as described, it becomes possible to provide the DC backup power supply system with enhanced reliability in respect of the non-service interruption function against the specific load 142.

Figure 7:
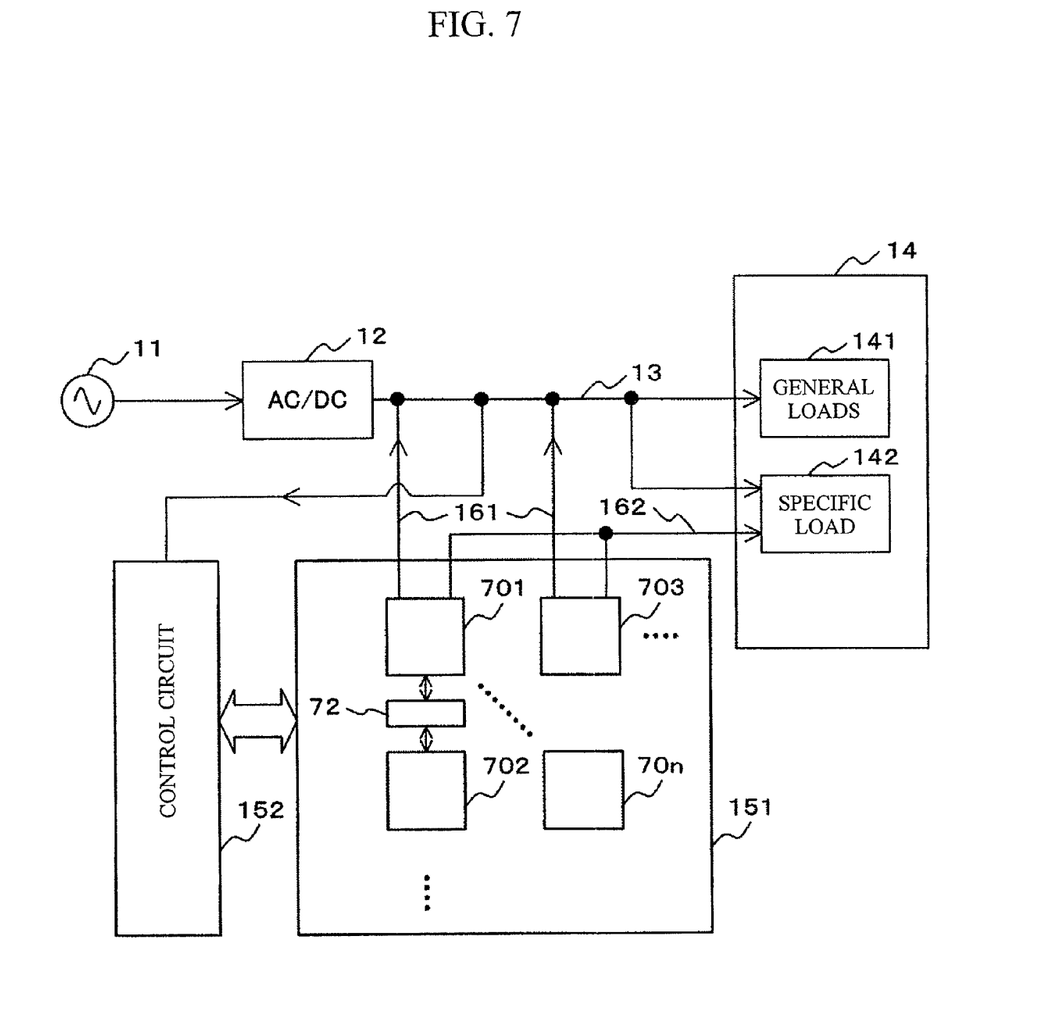
FIG. 7 is a schematic block diagram of a second embodiment of a DC backup power supply system according to the invention.

FIG. 7 is a schematic block diagram of a second embodiment of a DC backup power supply system according to the invention. The DC backup power supply system according to the present embodiment comprises DC power storage means 151 wherein a multitude of unit batteries 701 to 70n are disposed in a matrix fashion, and connection switchover means 72 for the respective unit batteries arranged in a serial direction are provided. The DC power storage means 151 has a configuration in which respective portions of the unit batteries 701 to 70n, sufficient in capacity to provide backup only, are parallel-connected to an output line 13 of an AC/DC converter 12. A control circuit 152 controls recharging of the respective unit batteries, 701 to 70n, or discharging from the DC power storage means 151 to loads 14, and so forth. For example, the respective unit batteries disposed in the matrix fashion are composed of a single cell or a plurality of battery cells connected in series, and only the respective unit batteries disposed in the first row (that is, 701, 703, . . . ) incorporate an output circuit for sending out power of the respective unit batteries to the output line 13 of the AC/DC converter 12. The recharging of the batteries is executed from the output line 13 to respective groups of the unit batteries connected in series (701, 702, . . . , and 703, 70n, . . . ) with the connection switchover means 72 via a charger inside the control circuit 152, through output circuit input units of the respective unit batteries disposed in the first row (that is, the input units of the respective unit batteries without passing through the respective output circuits thereof). The discharging from the batteries is executed from respective groups of the unit batteries to the loads via the output circuits of the respective unit batteries disposed in the first row of the respective groups of the unit batteries connected in series (701, 702, . . . , and 703, 70n, . . . ) with the connection switchover means 72. The output circuit may comprise a diode with an anode thereof, connected to the unit battery, and with a cathode thereof, connected to an output line, or a MOS switch. Otherwise, the output circuit may have a configuration in which a diode and a MOS switch are connected in series. In the case of using the MOS switch, a signal for controlling discharge ON/OFF is delivered from the control circuit to the gate of the MOS switch.

Series/parallel connection of the unit batteries to the power line 13 for the output of the AC/DC converter 12 may be implemented such that, for example, only a necessary portion of the unit batteries arranged in the serial direction (for example, 701, 702, . . . , ) corresponding to the DC voltage of the power line 13 (that is, a backup voltage line) is connected in series by the connection switchover means 72 while only a necessary portion of the unit batteries arranged in a parallel direction (for example, 701, 703, . . . , ) corresponding to a backup capacity required by the loads 14 is connected in parallel. In the case where the backup voltage line is predetermined, only one unit battery may be provided in the serial direction, and only a necessary portion of the unit batteries arranged in the parallel direction, corresponding to the backup capacity required by the loads 14 may be connected in parallel. In this case, the respective unit batteries need to have a switch for sending out the power of the respective unit batteries to the power line 13 besides the single cell or the plurality of the battery cells connected in series as described above, and ON/OFF of the switch is controlled by the control circuit 152. By rendering the backup voltage line, and the backup capacity finely variable in this way, the DC backup power supply system can be applied to a variety of load configurations, and power supply systems, thereby enhancing general versatility. Further, with commonality of the control circuit 152 regardless of the number of series/parallel connections of the unit batteries, it is possible to achieve reduction in the cost of the DC backup power supply system.

Figure 8:
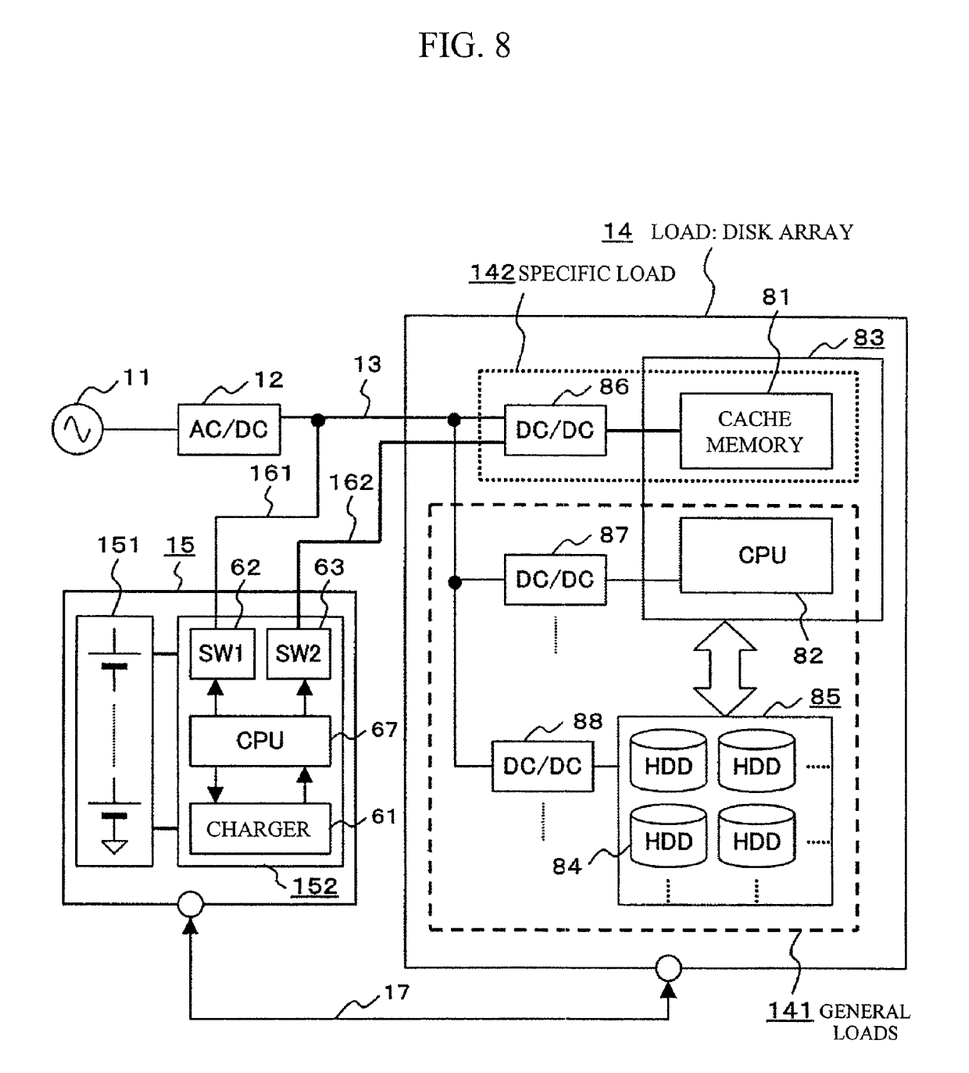
FIG. 8 is a schematic block diagram of a disk array provided with a third embodiment of a DC backup power supply system according to the invention.

FIG. 8 is a schematic block diagram of a disk array provided with a third embodiment of a DC backup power supply system according to the invention. With the present embodiment, a power supply system comprising an AC/DC converter 12, a DC backup power supply 15, and so forth is applied to the disk array device. Loads 14 represent the disk array device comprising mainly a disk array control unit 83, and a disk array unit 85. The disk array control unit 83 incorporates a cache memory 81, a CPU 82, and so forth. A plurality of hard disk drives 84 are disposed in the disk array unit 85. Further, the disk array device 14 comprises DC/DC converters 86 to 88, for supplying DC power to individual loads inside the device, and so on. The DC backup power supply 15 has basically the same configuration as that for the embodiment described with reference to FIG. 6, and parts in FIG. 8, corresponding to those in FIG. 6, are denoted by like reference numerals, thereby omitting duplicated description thereof. Further, since the operation at the time of recharging has been described with reference to FIG. 6, description thereof is similarly omitted.

Now, a backup operation in FIG. 8 is described hereinafter. Upon detection of a drop in the output voltage $V_{13}$ of the AC/DC converter 12 by a control circuit 152 at the time of a power outage of a commercial AC power source 11, at the time when the AC/DC converter 12 is in abnormal operation, and so forth, an output circuit 62 is turned ON in accordance with an discharge instruction from a CPU 67. Accordingly, power supply from DC power storage means 151 to the disk array device 14 in whole is executed. At this point in time, a signal giving a notification on occurrence of the power outage is transmitted from the CPU 67 to the loads 14 through an interface line 17. Upon receiving the notification, the disk array control unit 83 executes a processing for saving data accumulated in the cache memory 81 at present on the hard disk drives 84, a stop processing, and so forth. Similarly, the disk array unit 85 as well executes a stop processing, and so forth. Upon completion of all the stop processing, the loads 14 send out an instruction for backup output switchover to a DC backup power supply 15 through the interface line 17. Upon receiving the instruction for the backup output switchover, the CPU 67 interrupts the output circuit 62. An output circuit 63, which is normally ON, remains in the ON condition, and turns OFF power supply for other circuits within the DC backup power supply 15, thereby stopping operations thereof. As a result, power supply from the main power source to the loads 14 through a power line 13 is terminated, thereby turning OFF the disk array 14. However, only the cache memory 81 receives power from the DC power storage means 151 via the output circuit 63 and a line of a second DC backup output 162, thereby continuing operation.

The present embodiment is summed up as follows. First, the object of the present embodiment is the disk array comprising the AC/DC converter 12 for receiving AC from the commercial AC power source 11 to be converted into DC, together with the CPU 82, the hard disk drives 84, and the cache memory 81, to which DC output of the AC/DC converter 12 is supplied. Now, at the time of the power outage of the commercial power source, a first DC backup output 161 is supplied from the DC power storage means 151 to a plurality of the loads 14 including the cache memory until a predetermined time, or a predetermined signal (a signal from the interface line 17) is received. Further, there is provided the control circuit 152 for connecting the line of the second DC backup output 162 from the DC power storage means 151 to the cache memory regardless of the power outage of the commercial power source 11 or sound operation thereof. Furthermore, there are provided a plurality of the DC/DC converters 86 to 88, for stepping down the first DC backup output and/or the second DC backup output before supplying power to the CPU 82, the hard disk drives 84, and/or the cache memory 81, respectively.

With the adoption of such a configuration as described above, the disk array 14 interrupts the output circuit 62 upon receiving the instruction for the backup output switchover, so that power supply from the main power source to the disk array 14 through the power line 13 is terminated, thereby turning OFF the disk array 14. However, the output circuit 63 that is normally ON remains in the ON condition, and only the cache memory 81 continues to receive power from the DC power storage means 151 via the output circuit 63, and the line for the second DC backup output 162, so that the operation thereof can be continued. Hence, the disk array 14 can have high reliability.

Figure 9:
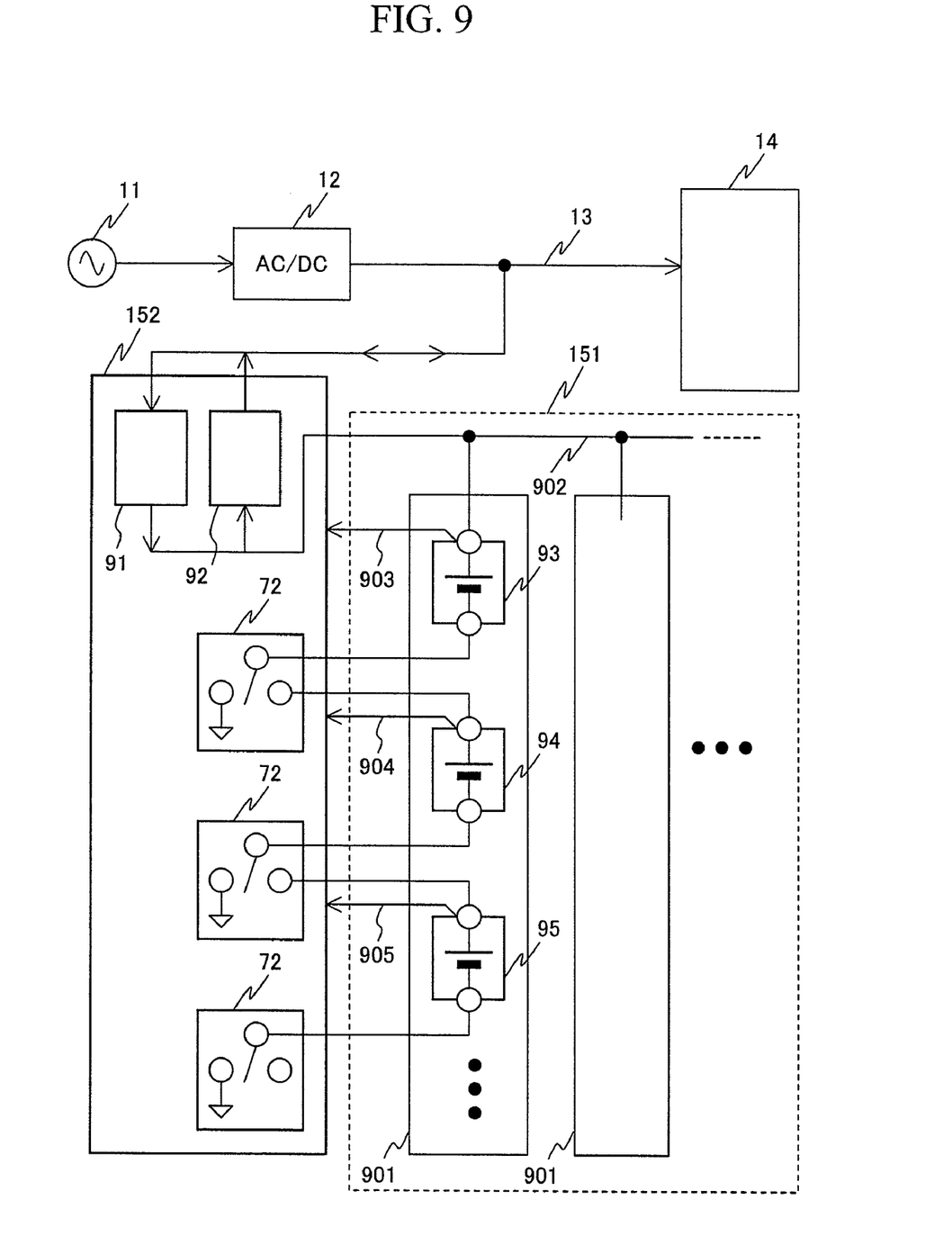
FIG. 9 is a schematic block diagram of a fourth embodiment of a DC backup power supply system according to the invention.

FIG. 9 is a schematic block diagram of a fourth embodiment of a DC backup power supply system according to the invention. Duplicated description of parts corresponding to those of the embodiment described with reference to FIG. 7 is omitted. With the present embodiment in FIG. 9, the output circuit for backup of the specific load as shown in the embodiment described with reference to FIG. 7 is not provided, however, with the present embodiment as well, a backup output circuit for exclusive use for connection to a specific load can be provided as necessary as with the embodiment described with reference to FIG. 7. This can be implemented by adopting a configuration such that, for example, a backup output line for exclusive use for connection to a specific load, leading from an output circuit 92, is newly provided to thereby deliver a backup output to the specific load inside loads 14.

The embodiment shown in FIG. 9 represents a case where a control circuit 152 incorporates a charger 91, the output circuit 92, and connection switchover means 72. Further, the output circuit 92 may comprise a diode, a MOS switch, and so forth, as with the case of the embodiment shown in FIG. 7. With the present embodiment, power delivery from, or to DC power storage means 151 is achieved by the charger 91, and the output circuit 92, but these may be combined into one instead, thereby making up, for example, a two-way DC-DC converter. The connection switchover means 72 may be made up of various types of relays such as a semiconductor relay, mechanical-type relay, and so forth. The DC power storage means 151 comprise unit battery groups 901 of unit batteries 93, 94, 95, . . . , each battery being composed of a single cell or a plurality of battery cells connected in series, and arranged in the columnar direction. The unit batteries inside the respective unit battery groups are connected in series by the connection switchover means. For example, in the case of connecting the unit batteries 93, 94 together, it need only be sufficient to throw a switch of the connection switchover means at the upper level as seen in the figure to the right side, thereby connecting the minus electrode of the unit battery 93 to the plus electrode of the unit battery 94, and to throw a switch of the connection switchover means at the middle level to the left side, thereby connecting the minus electrode of the unit battery 94 to the ground. The unit battery groups are connected in parallel to a power line 902 inside a backup power supply so as to correspond to a backup capacity as required. In this case, commonality of the connection switchover means may be attempted such that series-connection of the unit batteries in the respective unit battery groups can be implemented by a single connection switchover means provided in respective row directions, or by providing a plurality of connection switchover means in the respective row directions, corresponding to the number of parallel connections.

Recharging is executed from an output line 13 through the charger 91 inside the control circuit 152 to the respective unit battery groups 901 via the power line 902 inside the backup power supply. Discharging is executed from the respective unit battery groups to the loads via the power line 902, and the output circuit 92. Respective operations of the charger, the output circuit, and the connection switchover means are controlled by a CPU inside the control circuit 152.

Further, in order to monitor voltage as well as temperature of each of the unit batteries, to provide protection at the time of an abnormal operation, and to detect the amount of the actual capacity that remains in the respective unit battery groups, sensing lines 903, 904, 905, . . . are provided to be led into the control circuit 152 for internal processing.

Thus, with the present embodiment, a backup voltage line and backup capacity are rendered finely variable by virtue of a battery unit configuration method, the connection switchover means for battery units, and so forth, as with the case of the embodiment described with reference to FIG. 7. Accordingly, the DC backup power supply system can be applied to a variety of load configurations, and power supply systems, thereby enhancing general versatility. Further, with the adoption of a configuration in which the charger, and the output circuit are installed inside the control circuit 152, thereby enabling the battery units to be centrally controlled, it is possible to achieve reduction in the cost of the DC backup power supply system, and also, to implement maintenance with greater ease.

Figure 10:
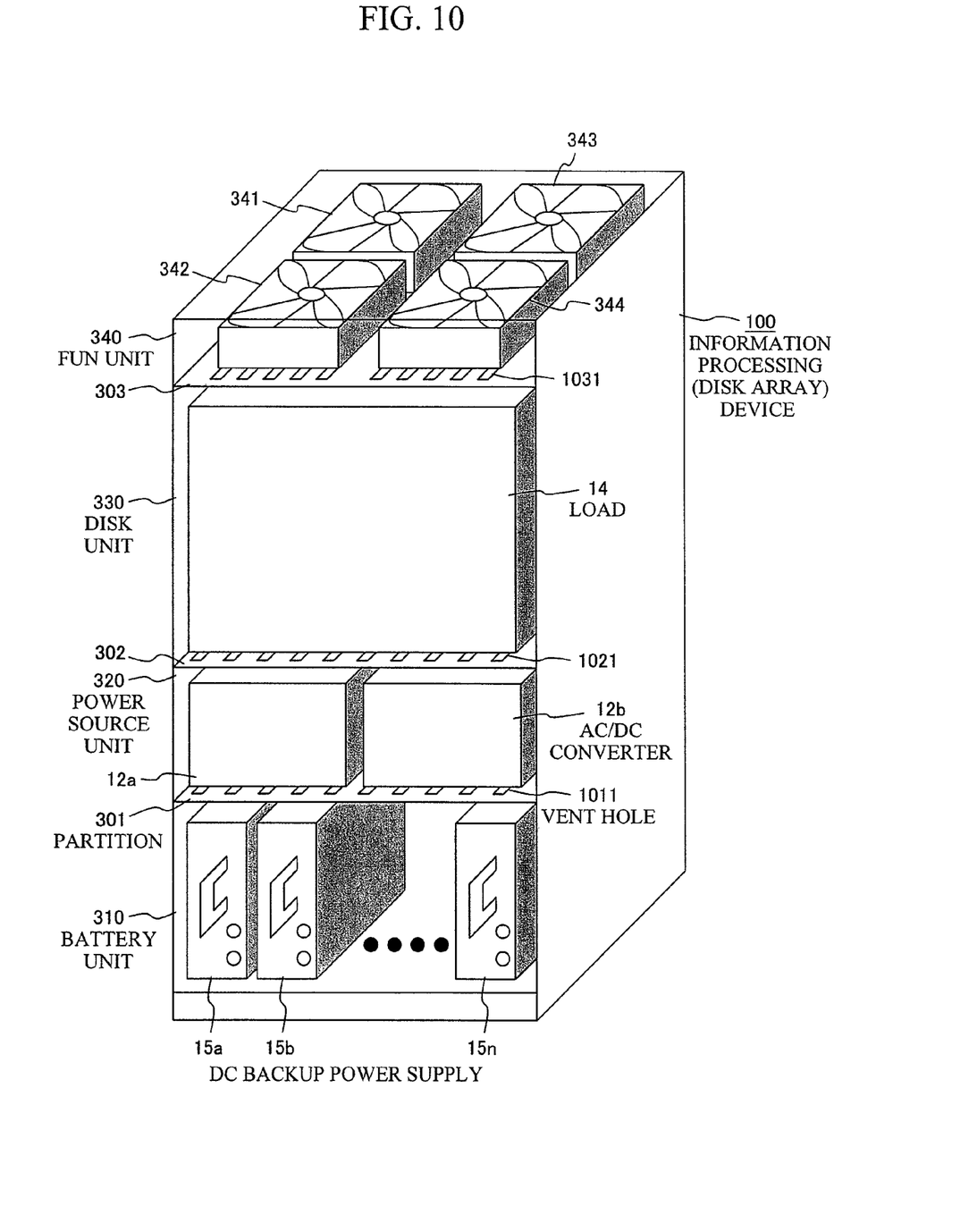
FIG. 10 is a schematic block diagram of an embodiment of the disk array device provided with a DC backup power supply system of the invention.

Next, FIG. 10 is a perspective view of a schematic configuration adapted to a disk array device as an example of an information processing system where the DC backup power supply system of this invention is installed. The elements designated with the same reference numerals are constituted with the same members in the identical configurations and effects.

The disk array device 100 is provided with a rack configuration which is divided into a plurality of stages of accommodation space in the vertical direction with a plurality of partitions 301, 302, and 303. In this embodiment, these accommodation spaces are formed of four stages which are sequentially formed from the lower side as a battery unit 310, a power supply unit 320, a disk unit 330, and a fan unit 340. In the battery unit 310 at the bottom stage, DC backup power supplies 15a, 15b, . . . , 15n are disposed. In the power source unit 320 in the accommodation space just above the battery unit 310, two AC/DC inverters 12a, 12b are disposed. In the disk unit 330 just above the power source 320, a load 14 including a plurality of hard disk drives (hereinafter, referred to as HDD) and a controller or the like is disposed. In the fan unit 340 at the uppermost accommodation space, four fans 341 to 344 are installed. This disk array (information processing) device 100 can be expanded as required in the load such as HDD and controller or the like to be installed in the disk unit 330, while the fans in the fan unit 340 may also be expanded as required within the accommodation space of the rack.

The backup power supplies 15a to 15n can be increased or decreased in the number of units in accordance with the required capacity of the electronic devices prepared as the backup devices within the disk unit 330 and fan unit 340 provided as the load of these power sources. Capacity per single unit of the backup power supplies 15a to 15n is preferably set to a load capacity for minimum configuration of the device, namely to the capacity to enable the backup operation in the device configuration to provide the minimum load capacity. The number of units of the backup power supplies can be increased in accordance with increase in the load capacity. The space of battery unit 310 is designed to provide the load capacity for the maximum configuration of device, namely to accommodate the number of units of backup power supplies 15a to 15n to enable the backup operation for the device configuration to provide the maximum load capacity. Regarding the power source 320, two units of the AC/DC converters 12a, 12b are mounted in the state illustrated in the figure. However, two units are not always required. For improvement in reliability of the device, the AC/DC converter is duplicated or the required number of units of converters are installed within the power source unit 320 in view of increasing the capacity of converter due to increase in the load capacity. A plurality of fans 341 to 344 disposed in the fan unit 340 are provided to control temperature rise of each component by absorbing, from the lower side and exhausting to the upper side of the device, the heat generated from components in each unit described above. In this embodiment, the fan unit 340 is disposed in the uppermost part of the rack. However, this fan unit can also be disposed in a plurality of places in the disk array device. Here, it is desirable to raise the cooling effect of each component by providing, for example, the fan unit to various areas such as the area between the power source unit 320 and disk unit 330 and the intermediate area of the disk unit 330. Moreover, the partitions 301 to 303 for dividing the rack in the vertical direction are respectively provided with vent holes 1011 to 1031.

In the aforementioned mounting configuration, the AC power supplied from the commercial AC power source 11 is converted to the DC power by the AC/DC converter 12 and this DC power is then supplied to the load 14 accommodated in the disk unit 330 and fan unit 340 in the information processing device 100 through the power line 13.

In the embodiment of this invention, in order to realize long-term backup operation of the particularly important load accommodated in the load 14, this particular load 142 is provided with a DC backup output 162 of the second backup power and an interface line 17, in addition to the power line 13 for supplying the power to the entire part of load 14. An ordinary load 141 means HDDs, fans, or the like. Meanwhile, the particular load 142 means, for example, cache memories.

If power outage occurs, the control circuit 152 supplies first the power to the entire part of load 14 from the power line 13. After the predetermined period has passed, the output to the power line 13 is suspended and the power is supplied only to the cache memories from the exclusive DC backup output 162 for particular load. The backup period of cache memories is longer than the backup period of particular load 14. For example, capacity of the secondary battery is surely acquired to ensure the backup period as long as 10 to 40 hours.

In addition, the power line 13, DC backup output 162, and interface line 17 are provided as the lead wires of bus configuration in the disk array device 100 of the rack configuration. Therefore, the DC backup power supply system 15, AC/DC inverter 12, ordinary load 141, and particular load 142 can easily be expanded as described above.

As described above, when the DC backup power supply system of the invention is adapted to the disk array device, the maintenance work for the backup power supply system can be performed and the active connectors can be easily inserted and removed by checking only the DC backup power supply system 15 accommodated within the rack of battery unit 310 because a function switch for switching over the power line 13 and the DC backup output 162 is not provided in the rack where the power source 320 and disk unit 330 are accommodated.

What is claimed is:

1. A DC backup power supply system having a plurality of loads to which AC from a commercial power source is supplied, and DC power storage means for supplying DC power to the plurality of the loads at the time of a power outage of the commercial power source, said DC backup power supply system comprising:

a control circuit having a first DC backup output for supplying a power from the DC power storage means to the plurality of the loads, including a specific load of a cache memory, during a predetermined initial time of the power outage of the commercial power source and/or until a predetermined signal from the loads, and a second DC backup output for continuously supplying a power from the DC power storage means to the specific load regardless of the power outage of the commercial power source or sound operation thereof, the control circuit supplying the respective powers from the same DC power storage means to the first and second DC backup outputs, wherein a power capacity of the second DC backup output being smaller than a power capacity of the first DC backup output.

2. A DC backup power supply system having an AC/DC converter for converting AC power from a commercial power source into DC power, a plurality of loads to which the DC power from the AC/DC converter is supplied and including a specific load and a general load, the specific load including a cache memory, and DC power storage means for supplying DC power to the loads at the time of a power outage of the commercial power source, the DC backup power supply system comprising:

a first line for supplying a first DC backup output to the loads from the DC power storage means via a first output circuit, a second line for connecting the DC power storage means to the specific load via a second output circuit, regardless of the power outage of the commercial power source or sound operation thereof, the second output circuit being normally ON, and for supplying a second DC backup output to any said specific load of the loads from the DC power storage means via the second output circuit, a power capacity of the second DC backup output being smaller than a power capacity of the first DC backup output, and a control circuit for supplying the first DC backup output to the loads from the first line via the first output circuit at the time of the power outage of the commercial power source, and for stopping the first DC backup output to the loads from the first line via the first output circuit upon the passage of a predetermined time and/or in response to signal from the loads.

3. A DC backup power supply system according to claim 2, wherein the first line for the first DC backup output toward the loads is a two-way output line through which recharging or discharging of the DC power storage means can be carried out.

4. A DC backup power supply system according to claim 2, wherein the power capacity of the first DC backup output to the loads is not less than ten times as large as the power capacity of the second DC backup output to the cache memory.

5. A DC backup power supply system according to claim 2, wherein the duration of the first DC backup output is not more than one tenth of the duration of the second DC backup output.

6. A DC backup power supply system according to claim 2, wherein the cache memory receives the first DC backup output via a diode, and receives the second DC backup output via a plurality of diodes.

7. A DC backup power supply system according to claim 2, wherein the DC power storage means comprises a plurality of secondary battery groups connected in parallel, each composed of a plurality of secondary batteries connected in series, including a secondary battery group different in kind from another group.

8. A DC backup power supply system according to claim 7, comprising the secondary battery group being different in discharge rate from the another group.

9. A DC backup power supply system according to claim 2, wherein the control circuit comprises a charger for supplying power to the DC power storage means, a latch circuit for controlling the second output circuit, an auxiliary power source as the power source of the latch circuit, and a CPU for controlling the charger, the output circuits, the latch circuit, and the auxiliary power source.

10. A DC backup power supply system according to claim 9, wherein power is supplied from the auxiliary power source to the latch circuit during supply of the second DC backup output to the cache memory at the time of the power outage of the commercial power source, and while power supply to other circuits within the control circuit is stopped, the latch circuit is configured so as to interrupt the second output circuit in response to a predetermined instruction.

11. A DC backup power supply system according to claim 2, the DC power storage means comprising:

a unit battery composed of a single cell or a plurality of battery cells connected in series; and a plurality of parallel-connected unit battery groups composed of a plurality of the unit batteries connected in series, the DC backup power supply system further comprising a control circuit incorporating:

connection switchover means capable of optionally changing a number of parallel-connections of the unit battery groups so as to correspond to a backup capacity of loads, and implementing series connection of the unit batteries inside the respective unit battery groups;

a charger for recharging the respective unit battery groups with DC power; and an output circuit through which DC power is discharged from the respective unit battery groups to the loads.

12. A DC backup power supply system according to claim 11, wherein the charger and the output circuit comprise a DC/DC converter.

13. A DC backup power supply system according to claim 11, wherein the connection switchover means comprises a relay circuit, and series connection of the unit batteries is controlled by the relay circuit.

14. A disk array having an AC/DC converter for converting AC power from a commercial power source into DC power, a CPU to which DC power from the AC/DC converter is supplied, a plurality of loads including a general load including a hard disk drive and a specific load including a cache memory, and DC power storage means for supplying DC power to the loads at the time of a power outage of the commercial power source, the disk array comprising:

a first line for supplying a first DC backup output to the loads from the DC power storage means via a first output circuit, a second line for connecting the DC power storage means to the specific load via a second output circuit, regardless of the power outage of the commercial power source or sound operation thereof, the second output circuit being normally ON, and for supplying a second DC backup output to any said specific load of the loads from the DC power storage means via the second output circuit, a power capacity of the second DC backup output being smaller than a power capacity of the first DC backup output, a control circuit for supplying the first DC backup output to the loads from the first line via the first output circuit at the time of the power outage of the commercial power source, and for stopping the first DC backup output to the loads from the first line via the first output circuit upon the passage of a predetermined time and/or in response to signal from the loads.

15. A disk array according to claim 14, further comprising a plurality of DC/DC converters for stepping down the first and second DC backup outputs to be thereby supplied to the CPU, the hard disk drives, and/or the cache memory, respectively, wherein a DC/DC converter for supplying the second DC backup output to the cache memory steps down the second DC backup output to be supplied to the cache memory.

16. A disk array according to claim 14, the DC power storage means comprising:

a unit battery composed of a single cell or a plurality of battery cells connected in series; and a plurality of parallel-connected unit battery groups composed of a plurality of the unit batteries connected in series, the DC backup power supply system further comprising a control circuit incorporating:

connection switchover means capable of optionally changing a number of parallel-connections of the unit battery groups so as to correspond to a backup capacity of loads and implementing series-connection of the unit batteries inside the respective unit battery groups;

a charger for recharging the respective unit battery groups with DC power; and an output circuit through which DC power is discharged from the respective unit battery groups to the loads.

17. A disk array according to claim 16, wherein the charger and the output circuit comprise a DC/DC converter.

18. A disk array according to claim 16, wherein the connection switchover means comprises a relay circuit, and series-connection of the unit batteries is controlled by the relay circuit.

19. A DC backup power supply comprising DC power storage means and a control circuit, wherein the DC power storage means supplies a first DC backup output to a plurality of loads through a first line via a first output circuit at the time of the power outage of the commercial power source, the plurality of loads including a specific load and a general load, the specific load including a cache memory, and the DC power storage means supplies a second DC backup output to the specific load through a second line, the second line connecting the DC power storage means to the specific load via a second output circuit, regardless of the power outage of the commercial power source or sound operation thereof, the second output circuit being normally ON, and a power capacity of the second DC backup output being smaller than a power capacity of the first DC backup output, and wherein the control circuit supplies the first DC backup output to the loads from the first line via the first output circuit at the time of the power outage of the commercial power source, and stops the first DC backup output to the loads from the first line via the first output circuit upon the passage of a predetermined time and/or in response to signal from the loads.

* * * * *